US012709141B2

(12) United States Patent
Brown

(10) Patent No.: US 12,709,141 B2
(45) Date of Patent: Aug. 18, 2026

(54) TONNEAU COVER

(71) Applicant: Rivian IP Holdings, LLC, Irvine, CA (US)

(72) Inventor: Joseph Brown, Northville, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 312 days.

(21) Appl. No.: 18/440,867

(22) Filed: Feb. 13, 2024

(65) Prior Publication Data

US 2024/0375499 A1 Nov. 14, 2024

Related U.S. Application Data

(60) Provisional application No. 63/500,883, filed on May 8, 2023.

(51) Int. Cl.
*B60J 7/19* (2006.01)
*B60J 7/04* (2006.01)
*B60J 7/14* (2006.01)

(52) U.S. Cl.
CPC ................ *B60J 7/198* (2013.01); *B60J 7/04* (2013.01); *B60J 7/141* (2013.01)

(58) Field of Classification Search
CPC ... B60J 7/04; B60J 7/141; B60J 7/1607; B60J 7/198
USPC .......................... 296/100.02, 100.03, 100.04
See application file for complete search history.

(56) References Cited

U.S. PATENT DOCUMENTS 5,350,213 A * 9/1994 Bernardo ................. B60J 7/041 296/100.09
10,525,804 B2 1/2020 Pompili et al.
10,988,009 B1 * 4/2021 Weng ........................ B60J 7/141
11,014,435 B1 * 5/2021 Voegele ................... B60J 7/198
11,091,013 B2 8/2021 Pompili et al.
11,318,826 B2 5/2022 Pompili et al.
11,724,582 B2 * 8/2023 Dylewski, II .......... B60J 7/1607 296/100.07
11,738,627 B2 * 8/2023 Fournier ................. B60R 9/065 296/100.02
11,745,571 B2 * 9/2023 Facchinello ............ E05C 9/043 296/100.07
12,296,664 B2 * 5/2025 Becker ..................... B60J 7/141
2022/0048435 A1 2/2022 Salewski
2023/0107288 A1 * 4/2023 Dylewski, II ............ B60J 7/198 296/100.07

* cited by examiner

*Primary Examiner* — Jason S Daniels
(74) *Attorney, Agent, or Firm* — BakerHostetler

(57) ABSTRACT

A tonneau cover can be provided for installation on a vehicle. The tonneau cover may be adaptably installed onto the vehicle. For example, in certain embodiments, the panels can be provided and/or stored individually and then installed into an assembled configuration on the vehicle to overlap a cargo area of the vehicle. In certain embodiments, the tonneau cover may be inserted at a perimeter of the cargo area. For example, the panels can be linked together as they are installed until secured onto the vehicle.

20 Claims, 11 Drawing Sheets

TONNEAU COVER

CROSS-REFERENCE TO RELATED APPLICATION

This application claims the benefit of U.S. Provisional Application No. 63/500,883, entitled "TONNEAU COVER," filed May 8, 2023, the entirety of which is incorporated herein by reference.

INTRODUCTION

The present description relates generally to vehicles. More particularly, the present disclosure relates to tonneau covers for vehicles. Tonneau covers may generally include systems that may provide shelter and protection of cargo that may be stored within the cargo area of certain adventure vehicles, such as pickup trucks. As it may be appreciated, drivers or owners of such adventure vehicles may often utilize their vehicles, for example, for camping, off-roading, or other similar recreational outdoors activities. It may be thus useful to provide a tonneau cover that may be adaptable for various purposes.

SUMMARY

In some embodiments, the present disclosure is directed to a tonneau cover for a vehicle. In certain embodiments, the tonneau cover may be adaptably installed onto the vehicle. For example, in certain embodiments, the panels can be provided and/or stored individually and then installed into an assembled configuration on the vehicle to overlap a cargo area of the vehicle. In certain embodiments, the tonneau cover may be inserted at a perimeter of the cargo area. For example, the panels can be linked together as they are installed until secured onto the vehicle.

In accordance with one or more aspects of the disclosure, a tonneau cover for a vehicle can include one or more inner panels and an end panel. The inner panel can include a receptacle, and the end panel can include an engager configured to releasably engage the receptacle of the inner panel. The end panel can further include sliders at opposing sides of the end panel and a locking assembly. The locking assembly can include retention tabs each retractably extending through a corresponding one of the sliders and a release handle configured to retract each of the retention tabs towards the corresponding one of the sliders when the release handle is actuated.

In accordance with one or more aspects of the disclosure, an end panel for a tonneau cover can include an engager configured to releasably engage a receptacle of an inner panel, sliders at opposing sides of the end panel, and a locking assembly. The locking assembly can include retention tabs each retractably extending through a corresponding one of the sliders, a release handle, and a cable connecting the release handle to the retention tabs and being configured to retract the retention tabs towards each other and into the sliders when the release handle is actuated.

In accordance with one or more aspects of the disclosure, a locking assembly can further include anchors coupled to a slat of the end panel and springs each configured to bias a corresponding one of the retention tabs away from a corresponding one of the anchors. The sliders can define holders each configured to secure a corresponding one of the anchors, wherein the holders extend into the slat. The retention tabs can each define an inner surface extending transversely to the sliders and an outer surface extending orthogonally to the sliders. The end panel can include a seal extending between the sliders on a side of the end panel that is opposite the engager. The tonneau cover can further include one or more additional inner panels each including an additional receptacle. Each inner panel can include an additional engager configured to releasably engage the additional receptacle of the additional inner panel, the additional engager being on a side of the inner panel that is opposite the receptacle and additional sliders at opposing sides of the inner panel. The end panel can include a cable connecting the release handle to the retention tabs and a slat extending between the sliders, wherein the cable extends within the slat and the release handle extends out of the slat. The end panel can include an end seal that is on a side of the end panel that is opposite the engager. A slat extending between the sliders, wherein the cable extends within the slat and the release handle extends out of the slat. An end seal can be on a side of the end panel that is opposite the engager.

In accordance with one or more aspects of the disclosure, a method of assembling a tonneau cover can include inserting an inner panel at least partially into rails of a vehicle to partially cover a cargo area. The method can further include engaging receptacles of the inner panel with engagers of an end panel. The method can further include inserting the end panel into the rails while advancing the inner panel along the rails to further cover the cargo area. The method can further include engaging recesses defined by the rails with retention tabs of the end panel to lock the end panel with respect to the rails.

Inserting the end panel into the rails can include retracting the retention tabs to be within the rails. Retracting the retention tabs comprises overcoming a bias to extend the retention tabs away from each other. The method can further include closing a tailgate of the vehicle to abut the end panel and enclose the cargo area. The method can further include actuating a release handle to retract the retention tabs out of the recesses, removing the end panel from the rails while retracting the inner panel along the rails, and removing the inner panel from the rails.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Embodiments of the present disclosure are directed toward a tonneau cover for an adventure vehicle, such as a pickup truck, a crossover utility vehicle (CUV), or a sport utility vehicle (SUV). In certain embodiments, the tonneau cover may be adaptably installed onto the vehicle. For example, in certain embodiments, the panels can be provided and/or stored individually and then installed into an assembled configuration on the vehicle to overlap a cargo area of the vehicle. In certain embodiments, the tonneau cover may be inserted at a perimeter of the cargo area. For example, the panels can be linked together as they are installed until secured onto the vehicle.

In this way, the tonneau cover may adaptably operate in the installed configuration as a tonneau cover to protect the cargo area of the vehicle and the driver or owner's cargo from environmental elements (e.g., precipitation, sunlight, wind, debris, and so forth) during, for example, camping, off-roading, or other similar recreational outdoors activities.

A tonneau cover can include individual panels that interlock with each other upon installation and disconnect from each other upon removal to selectably cover a truck bed or other region of a vehicle, such as a truck. A tonneau cover can be operated with manual installation and removal. It can be desirable to provide the tonneau cover with individual components (e.g., panels) that can connect and disconnect from each other.

Implementations of the subject technology described herein provide tonneau covers that include multiple panels. Tonneau covers described herein can include panels that provide reliable sealing there between. Tonneau covers described herein can include at least one panel that locks the panel assembly into place when installed.

Figure 1:
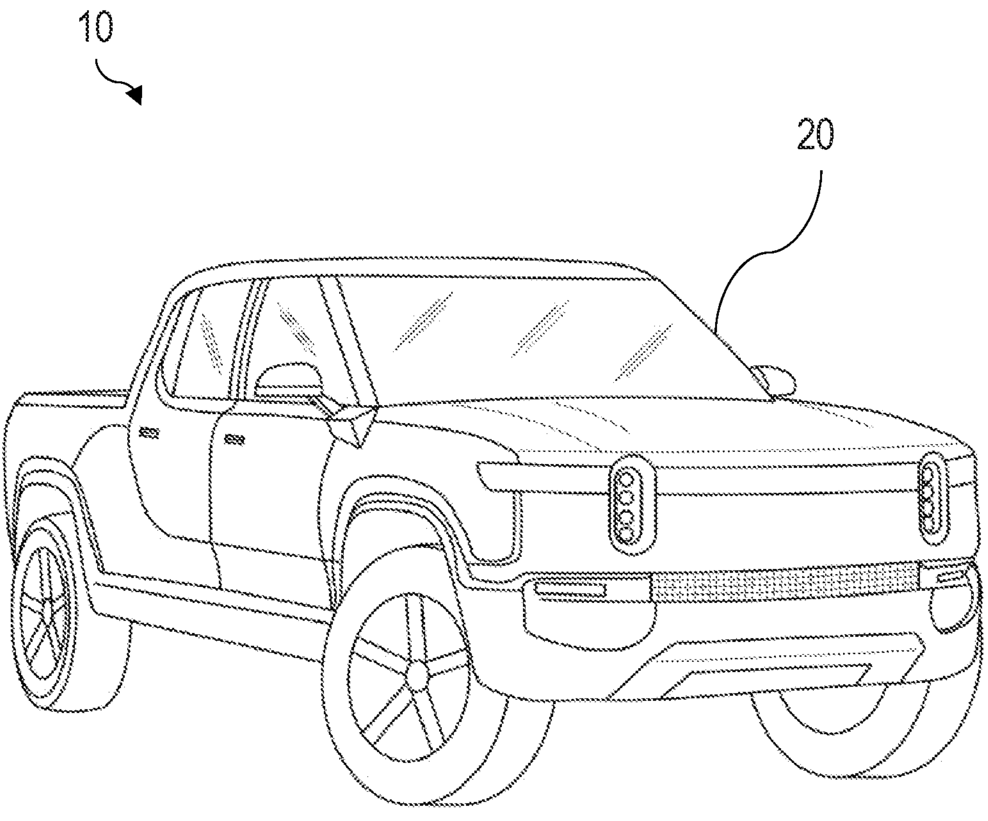
FIG. 1 illustrates an example embodiment of a vehicle environment including a vehicle, in accordance with implementations of the subject technology.

FIG. 1 illustrates an example embodiment of a vehicle environment 10 including a vehicle 20, in accordance with the presently disclosed embodiments. As depicted, the vehicle 20 may include any passenger vehicle (e.g., a car, a truck, a pickup truck, a sports utility vehicle (SUV), a minivan, a crossover utility vehicle (CUV), a cargo van, a towing truck) that may be utilized for transportation and to navigate one or more rural environments, urban environments, and/or off-roading and mountainous environments. In one embodiment, the vehicle 20 may include a gasoline-powered vehicle that may be propelled, for example, by an internal combustion engine (ICE) or other fuel-injection engine.

Figure 2:
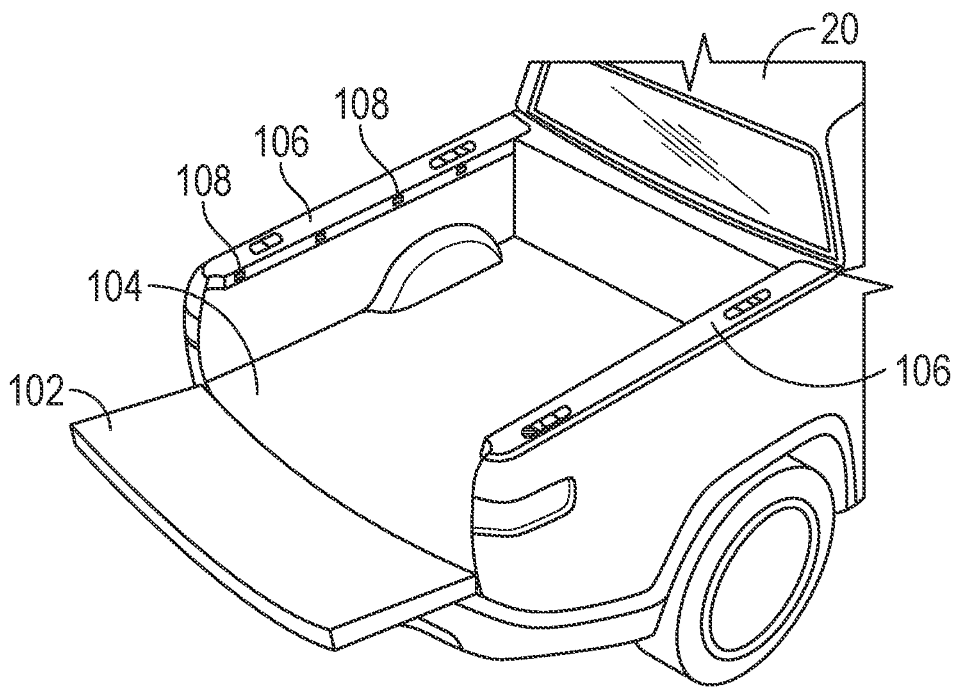
FIG. 2 illustrates a perspective view of a portion of a vehicle without a tonneau cover, in accordance with implementations of the subject technology.

As shown in FIG. 2, the vehicle 20 can include a cargo area 104 with a space that can be covered by a tonneau cover 120. The vehicle 20 can include one or more rails, such as a pair of rails 106 on opposing sides of the cargo area 104. In some embodiments, the rails 106 can define a recessed channel, a concave portion, a convex portion, a protrusion, and the like to allow one or more panels to slide along the rails. The rails 106 can each define one or more recesses 108 for engagement by one or more of the panels of the tonneau cover 120. Multiple recesses 108 can be provided so that engagement may be provided for one or more panels at one or more positions. In some embodiments, the recesses 108 can be distributed evenly, such that any adjacent pair of recesses 108 along the rails 106 can be separated by distance that is equal to a distance between any other adjacent pair of recesses 108. Each of the rails 106 on opposing sides of the cargo area 104 can include a same number of recesses 108 with the same distribution thereof. For example, each of the rails 106 on opposing sides of the cargo area 104 can include recesses 108 that are directly opposite and/or facing each other, such as on opposing lateral sides of the cargo area 104.

In some embodiments, the vehicle 20 can further include a tailgate 102 that can transition between an open configuration to provide access to the cargo area 104 and a closed configuration to enclose a portion of the cargo area 104. While in the open configuration, the tailgate 102 can provide access to an end of each of the rails 106 for insertion of panels.

Figure 3:
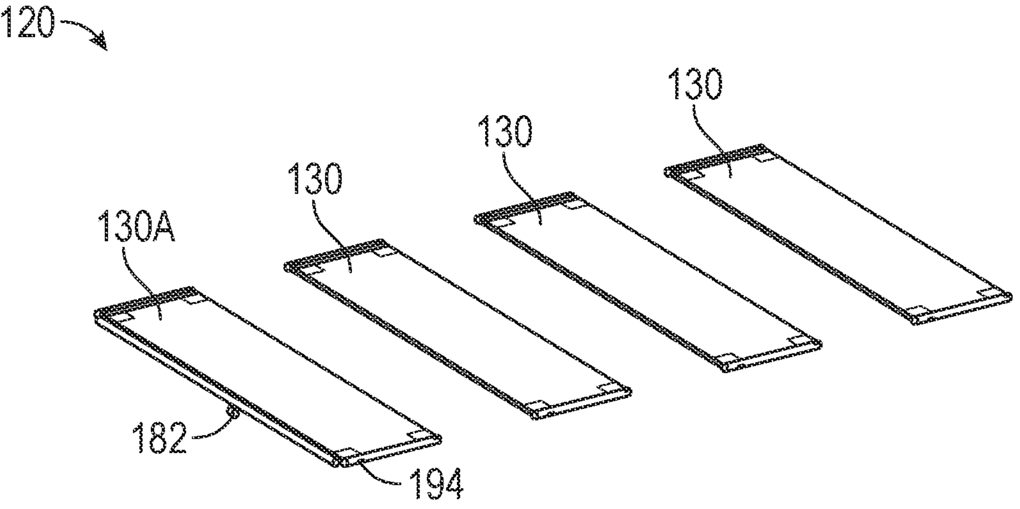
FIG. 3 illustrates a perspective exploded view of a tonneau cover, in accordance with implementations of the subject technology.

As shown in FIG. 3, a tonneau cover 120 can include multiple panels 130 for insertion and assembly at the vehicle. In some embodiments, one or more of the panels 130 can be an inner panel that can freely slide along the rails 106 of the vehicle. In some embodiments, at least one of the panels 130 can be an end panel 130A that includes one or more retention tabs 194 for engaging recesses 108 of the vehicle. One or more other panels 130 (e.g., the inner panels) may omit retention tabs 194, such that such inner panels can slide freely with respect to the rails 106 without engagement at the recesses 108.

Figure 4:
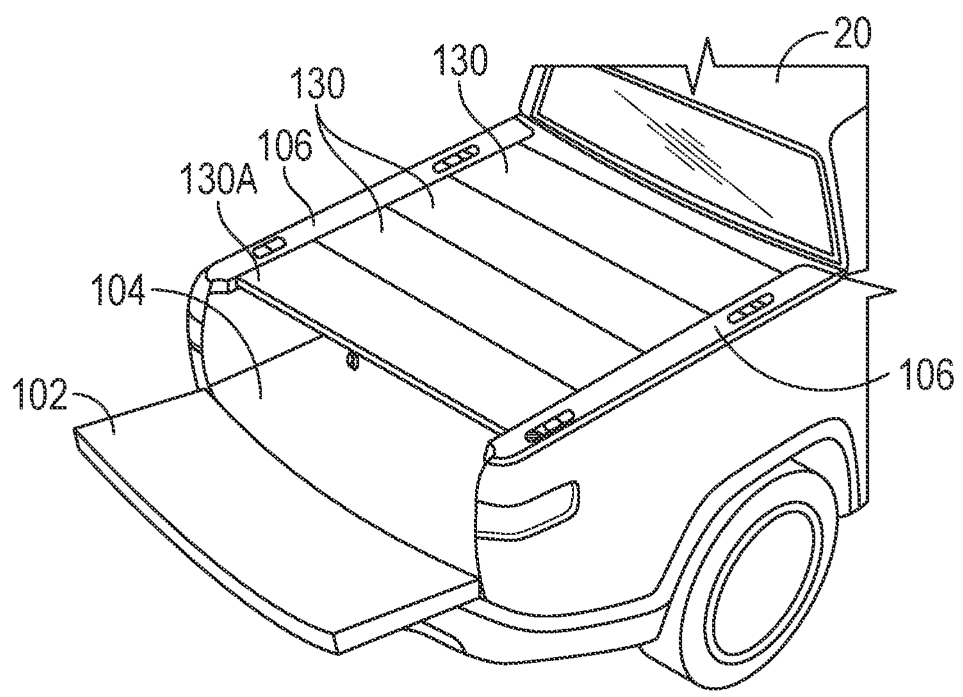
FIG. 4 illustrates a perspective view of a portion of a vehicle with a tonneau cover, in accordance with implementations of the subject technology.

As shown in FIG. 4, the panels 130 of the tonneau cover 120 can be inserted at the rails 106 of the vehicle 20. In some embodiments, the panels 130 can be inserted one at a time. For example, a first one of the panels 130 can be at least partially inserted at the rails. An additional panel 130 can be attached to the first one of the panels 130, and both panels 130 can be further inserted along the rails. A last one of the panels 130 (e.g., the end panel 130A) can similarly be attached to one of the other panels 130. When the tonneau cover 120 (e.g., as an assembly of panels 130 with the end panel 130A) is sufficiently inserted, the end panel 130A can engage one of the recesses 108 of the rails 106 to limit further movement of the tonneau cover 120 until release.

Figure 5:
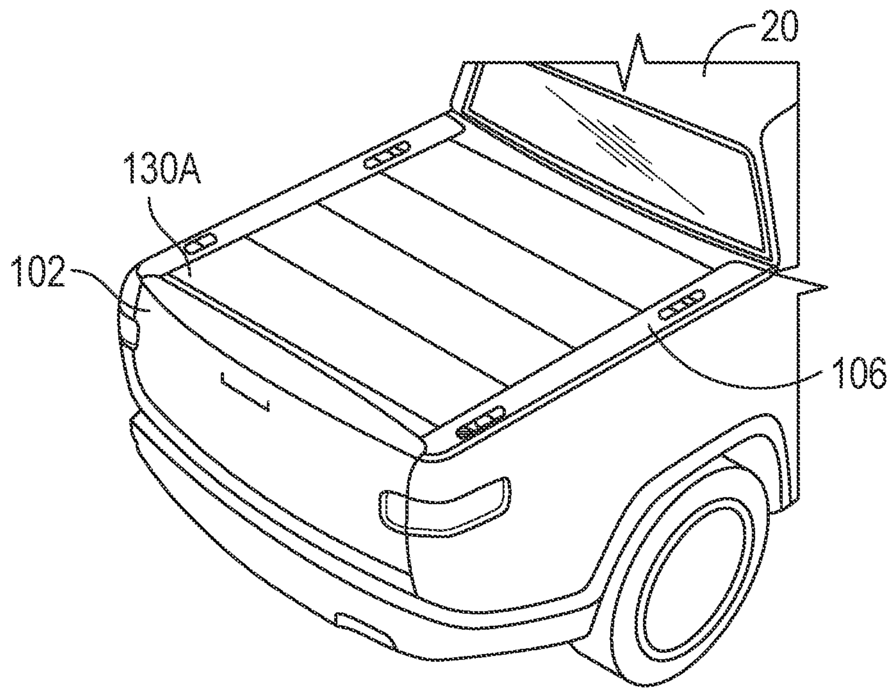
FIG. 5 illustrates a perspective view of a portion of a vehicle with a tonneau cover, in accordance with implementations of the subject technology.

As shown in FIG. 5, when the tonneau cover 120 is sufficiently inserted, for example with the end panel 130A engaging the recesses 108 of the rails, the tailgate 102 can be transitioned to the closed configuration. In such a configuration, the cargo area 104 can be fully enclosed by both the tonneau cover 120 and the tailgate 102. Furthermore, release and removal of the tonneau cover and/or any of its panels 130 can be limited and/or prevented while the tailgate 102 is in the closed configuration. For example, the tailgate 102, while in the closed configuration, can block an end of the rails 106 and/or a release handle 182 of the tonneau cover 120, such that the tonneau cover 120 is secured to the rails. In some embodiments, it can be necessary to transition the tailgate 102 to the open configuration before the tonneau cover 120 can be released and/or removed.

Figure 6:
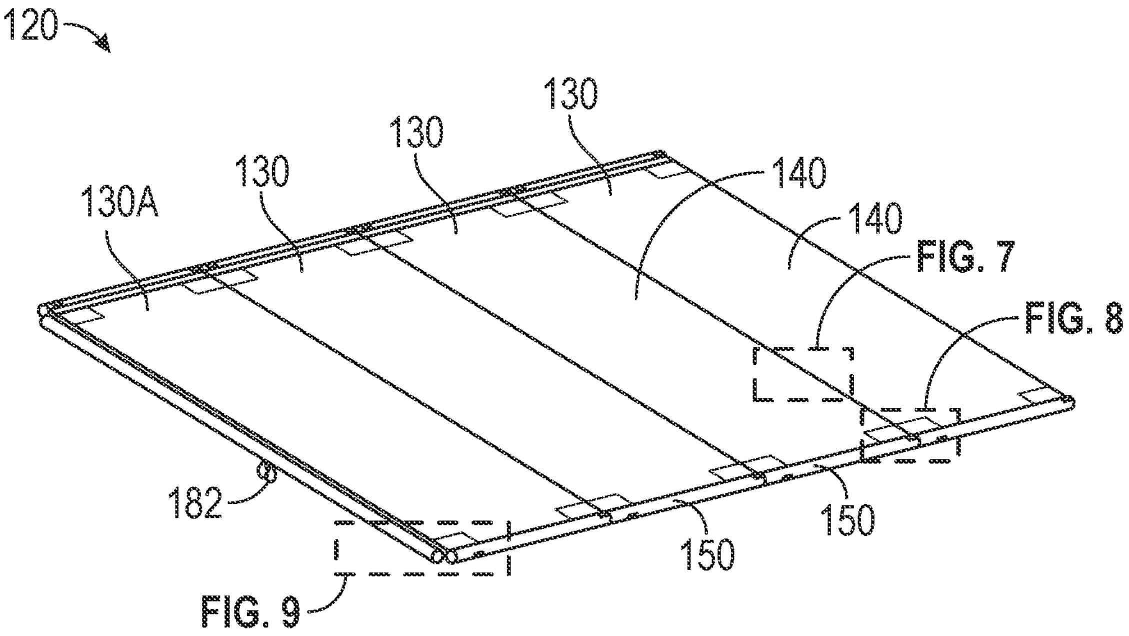
FIG. 6 illustrates a perspective assembled view of a tonneau cover, in accordance with implementations of the subject technology.

As shown in FIG. 6, multiple panels 130 (e.g., one or more inner panels and/or an end panel) can be assembled together to form a tonneau cover 120. While only three inner panels 130 and one end panel 130A are illustrated, it will be understood that any number of panels 130 can be used. For example, a single end panel 130A can be used with a selected number of inner panels 130 that combine to cover the cargo area 104 as desired. As described further herein, the total length of the assembled tonneau cover 120 can extend across an entirety or a portion of the length of the cargo area 104. Each of the panels 130 (e.g., one or more inner panels and/or an end panel) can include a slat 140 that extends across the least a portion of the width of the corresponding panel 130 and sliders 150 at opposing ends of the slats 140. In some embodiments, the slats 140 can have a substantially uniform cross-sectional shape across the width thereof. Each of the sliders 150 can be provided as end caps at opposing ends of the slats 140. The sliders 150 can facilitate insertion and sliding of the panels 130 along the rails 106 of the vehicle. For example, the sliders 150 can form a cross-sectional shape that is complementary to the cross-sectional shape of the rails into which they are inserted. By further example, the rails 106 and the sliders 150 can form complementary shapes, where one, the other, or both form a groove, channel, concave shape, convex shape, protrusion, and the like.

Figure 7:
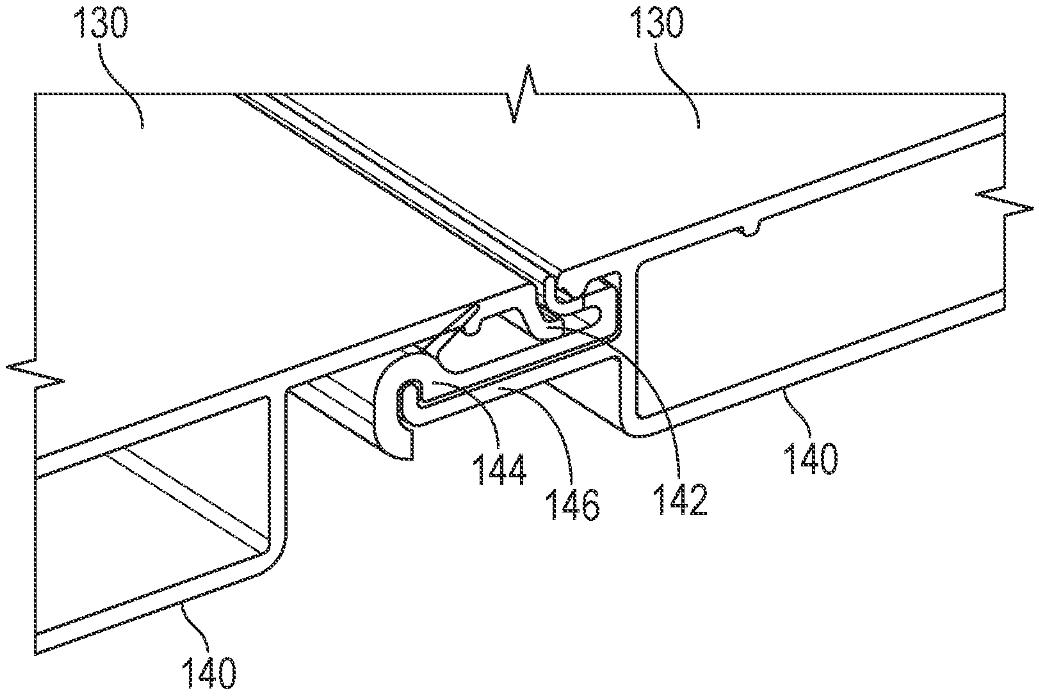
FIG. 7 illustrates a perspective sectional view of slats of a tonneau cover, in accordance with implementations of the subject technology.

As shown in FIG. 7, multiple panels 130 can be combined together to join at a seal 144 that limits ingress or egress of substances across the tonneau cover 120. For example, an end of a first panel 130 that faces an end of a second panel 130 can provide complementary sealing features. By further example, as shown in FIG. 7, a longitudinal end of a first slat 140 can provide a ledge 146 that supports a seal 144, and a longitudinal end of a second slat 140 can provide an insert 142 that abuts the seal 144 when the two panels 130 are installed and engage each other. The seal 144 can include a compliant and/or flexible material that compresses when the corresponding panels 130 are joined together to form a barrier against ingress or egress of substances (e.g., liquids, debris, moisture, etc.). The sealing features of each of the panels 130 can extend across a portion or the entirety of a width of the slats 140, such that scaling is provided across such a width. For example, the sealing features can extend across the corresponding slats 140 to each of the sliders 150 on opposing sides of the corresponding panels 130.

Figure 8:
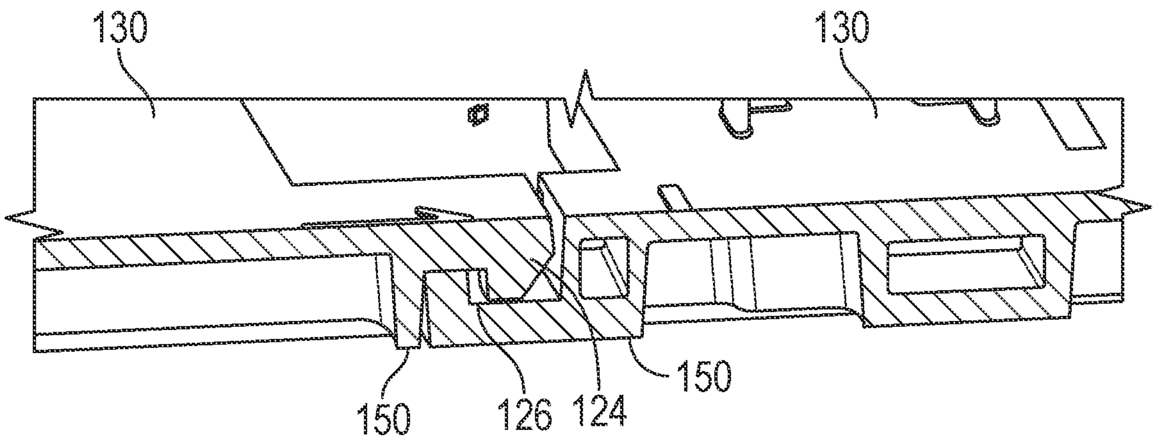
FIG. 8 illustrates a perspective sectional view of sliders of a tonneau cover, in accordance with implementations of the subject technology.

As shown in FIG. 8, the tonneau cover 120 can include engagers 124 for facilitating secure and releasable attachment of an adjacent pair of panels 130. In some embodiments, the engagers 124 can be formed as portions of the sliders 150. Accordingly, engagers 124 can be provided at opposing sides of each panel 130. The engagers 124 can include mechanisms such as locks, latches, snaps, slides, channels, screws, clasps, threads, magnets, pins, an interference (e.g., friction) fit, knurl presses, bayoneting, fused materials, and/or combinations thereof can be included to couple and/or secure the panels 130 together. The assemblies can remain secured to each other until an optional release mechanism is actuated and/or the engagers 124 are separated by relative motion in a particular direction. In some embodiments, the engagers 124 can maintain attachment of the adjacent pair of panels 130 while the sliders 150 are within the rails. For example, the rails 106 can limit or restrict movement of the panels 130 relative to each other in a manner that would otherwise achieve detachment and/or separation. As such, the engagers 124 can provide attachment and/or detachment while outside the rails and prevent detachment while within the rails. Accordingly, during installation, a portion of one of the panels 130 can be inserted into the rails 106 while the engagers 124 thereof remain exposed, so that the next panel 130 can be secured thereto. Likewise, during removal, portions of panels 130 with engagers 124 can be retracted out of the rails 106 to be exposed so that the engagers 124 can be released from each other.

Figure 9:
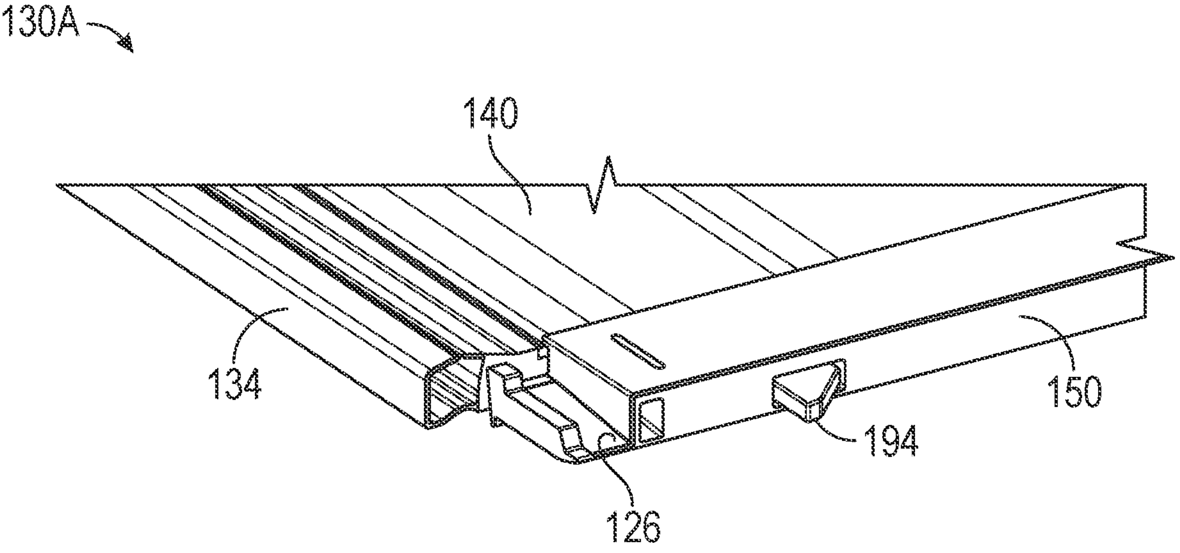
FIG. 9 illustrates a perspective view of a portion of an end panel of a tonneau cover, in accordance with implementations of the subject technology.

As shown in FIG. 9, an end panel 130A can include one or more features that are different from those of inner panels 130. In some embodiments, the end panel 130A can include one or more retention tabs 194 for engaging corresponding recesses 108 of the rails 106 (as shown in FIG. 2). In an extended configuration, the retention tabs 194 can extend to protrude beyond outer surfaces of the sliders 150. The retention tabs 194 can be configured to retract within the sliders 150, as described further herein. The end panel 130A can further include an end seal 134 at a longitudinal end of the end panel 130A. The end seal 134 can be configured to engage and/or abut a tailgate 102 of the vehicle when the tailgate 102 is in a closed configuration (as shown in FIG. 5). The end seal 134 can include a compliant and/or flexible material that compresses when the tailgate 102 is closed to form a barrier against ingress or egress of substances (e.g., liquids, debris, moisture, etc.). The end panel 130A can further include one or more receptacles 126 at ends of the sliders 150. While such receptacles 126 need not be utilized for receiving an engager 124 of an additional panel, such receptacles 126 can nonetheless be similar to receptacles 126 of inner panels 130 and be used for drainage. For example, the receptacle 126 and/or other features of the end panel 130A can provide drainage of substances to the rails, which can direct the substances therein away from the cargo area and/or to another location as desired.

Figure 10:
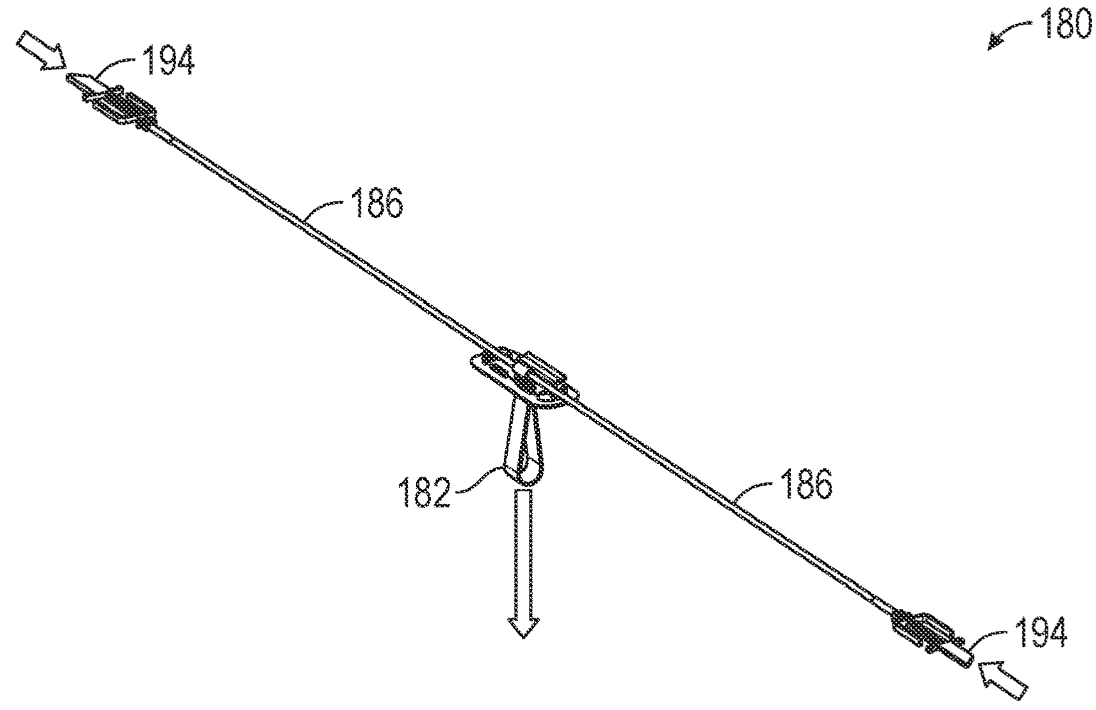
FIG. 10 illustrates a perspective view of a locking assembly of an end panel of a tonneau cover, in accordance with implementations of the subject technology.

As shown in FIG. 10, a locking assembly 180 of an end panel 130A can provide for releasable engagement with a vehicle. In some embodiments, the locking assembly 180 can include one or more retention tabs 194 that are configured to engage recesses 108 of rails 106 (as shown in FIG. 2). The locking assembly 180 can further include a release handle 182 for retracting the retention tabs 194 out of the recesses 108. For example, the release handle 182 can be connected to each of the retention tabs 194 by one or more cables 186. When the release handle 182 is actuated (e.g., pulled) in a direction such as downwardly (e.g., manually by a user), the tension in the cables 186 can retract the retention tabs 194 to disengage the recesses 108.

Figure 11:
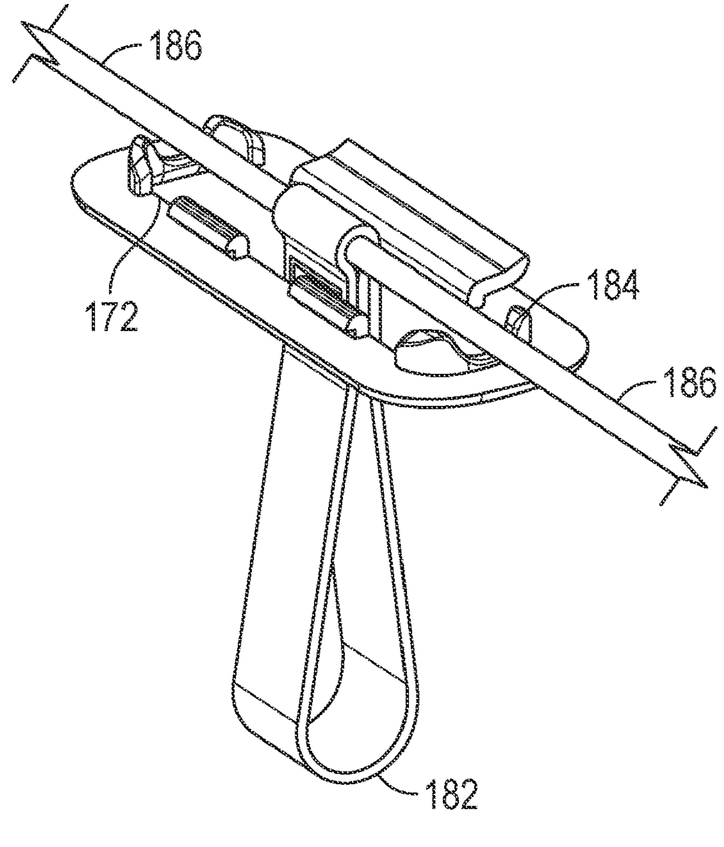
FIG. 11 illustrates a perspective view of a portion of the locking assembly of FIG. 10, in accordance with implementations of the subject technology.

As shown in FIG. 11, the release handle 182 can be coupled to one or more cables 186. While the release handle 182 can be accessible to a user (e.g., by extending through an opening 172 of a slat), the cable 186 can extend within a slat and/or other portion(s) of a panel. As such, at least a portion of the one or more cables 186 can be hidden from view. When the release handle 182 is actuated (e.g., pulled), one or more guides 184 of the locking assembly 180 can convert the force on the release handle 182 into tension on the one or more cables 186. For example, the guides 184 can facilitate movement of the one or more cables 186 and/or segments thereof towards each other when the release handle 182 is actuated (e.g., pulled). The guides 184 can include a shoulder, groove, channel, protrusion, pulley, and the like. While the cable 186 of FIG. 11 is shown as a single continuous structure, it will be understood that multiple cables 186 can be used with a connecting structure that can include one or more of a variety of features, such as a flexible rod, interconnected moving parts (e.g., rack and pinion), and the like.

Figure 12:
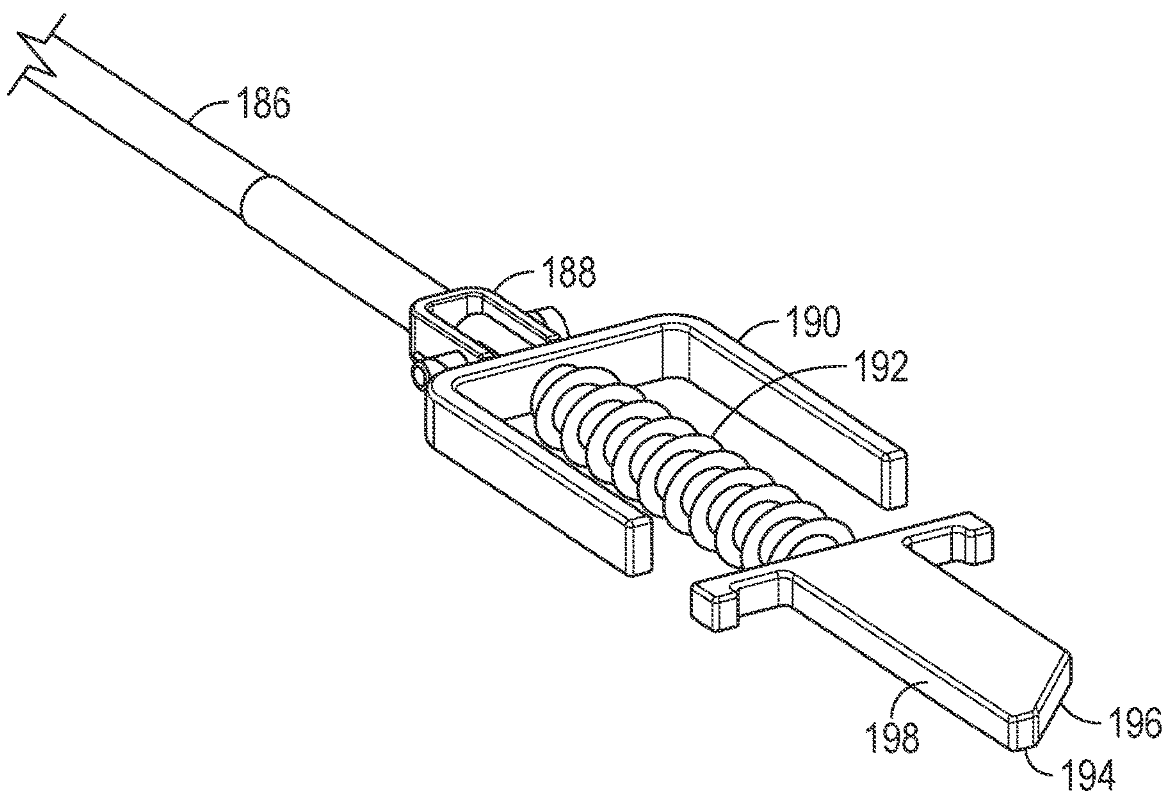
FIG. 12 illustrates a perspective view of a portion of the locking assembly of FIG. 10, in accordance with implementations of the subject technology.
Figure 13:
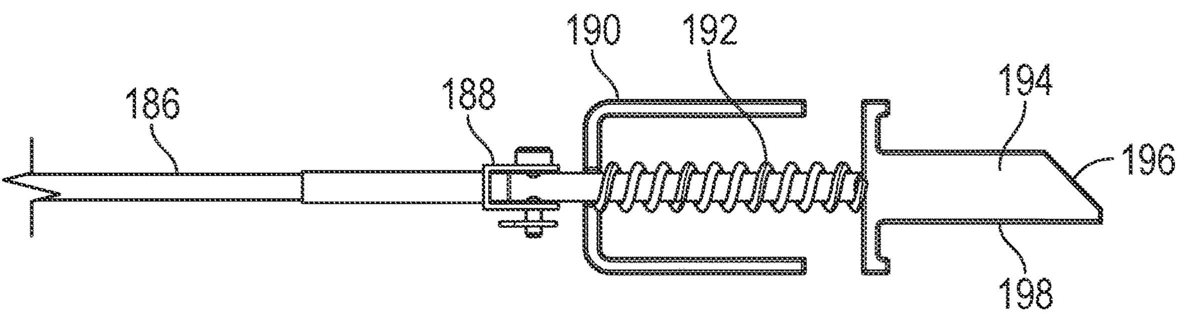
FIG. 13 illustrates a top view of a portion of the locking assembly of FIG. 10, in accordance with implementations of the subject technology.

As shown in FIGS. 12 and 13, the retention tab 194 can include features to provide different types of engagement upon insertion and removal of the panel. For example, the retention tab 194 can include an inner surface 196 and an outer surface 198. The inner surface 196 and the outer surface 198 can be on opposing longitudinal sides of the retention tab 194. Each of the inner surface 196 and the outer surface 198 can extend beyond the corresponding slider 150 (not shown) when the retention tab 194 is in an extended configuration. In some embodiments, the inner surface 196 can extend transversely to a side of the slider, and the outer surface 198 can extend generally orthogonally to the side of the slider. As the corresponding end panel 130A is inserted into the rails 106 of the vehicle, the inner surface 196 of the retention tab 194 can come into contact with the rail 106 and/or recesses 108 thereof. The inner surface 196, based on its shape, can urge the retention tab 194 to retract due to its sloped angle. For example, the inner surface 196 can include a slope, curve, chamfer, bevel, or other shape that transitions from a larger width of retention tab 194 to a narrower width of the retention tab 194. Accordingly, the end panel 130A can be freely inserted into the rails as the retention tab 194 retracts. The outer surface 198, based on its shape, can lock the retention tab 194 within one of the recesses 108. For example, the outer surface 198 can include a side that is generally orthogonal to the slider 150 and/or otherwise provides a structure for abutting a portion of the recess 108 into which the retention tab 194 is extended. While the retention tab 194 is extended, the outer surface 198 can resist retraction of the retention tab 194 upon movement of the panel in a rearward direction. Accordingly, the end panel 130A can be locked with respect to the corresponding recess until the release handle 182 is actuated (e.g., pulled) and the retention tab 194 is retracted.

As further shown in FIGS. 12 and 13, a spring 192 between the retention tab 194 and an anchor 190 of the locking assembly 180 can bias the retention tab 194 to the extended configuration. When the inner surface 196 interacts with another structure (e.g., the rail 106 and/or a recess), the retention tab 194 can be retracted against the force applied by the spring 192. When the retention tab 194 extends into a recess, the outer surface 198 can temporarily prevent removal of the end panel 130A due to the bias provided by the spring 192 and the interaction of the outer surface 198 with the recess. In some embodiments, the spring 192 can be incorporated into the cable 186 and/or the cable 186 can provide its own biasing force to bias the retention tabs 194 to the extended configuration. The locking assembly 180 can optionally further include a linkage 188 connecting the cable 186 to the retention tab 194. The anchor 190 can be configured to abut the retention tab 194 when it is in the retracted configuration. Accordingly, the anchor 190 can limit the extend of retraction of the retention tab 194.

Figure 14:
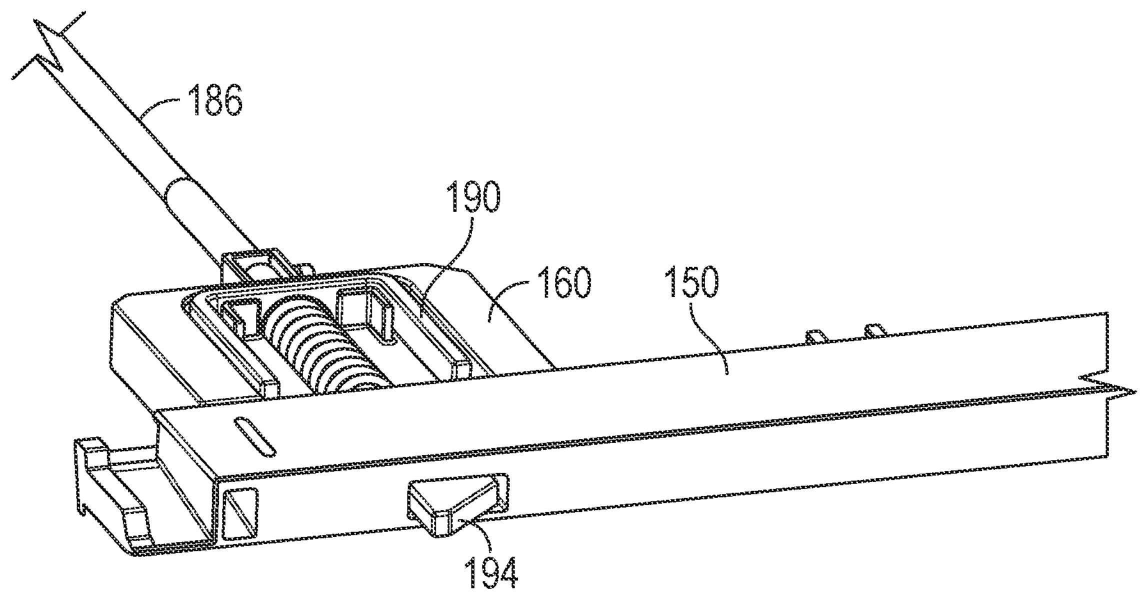
FIG. 14 illustrates a perspective view of a portion of a tonneau cover, in accordance with implementations of the subject technology.
Figure 15:
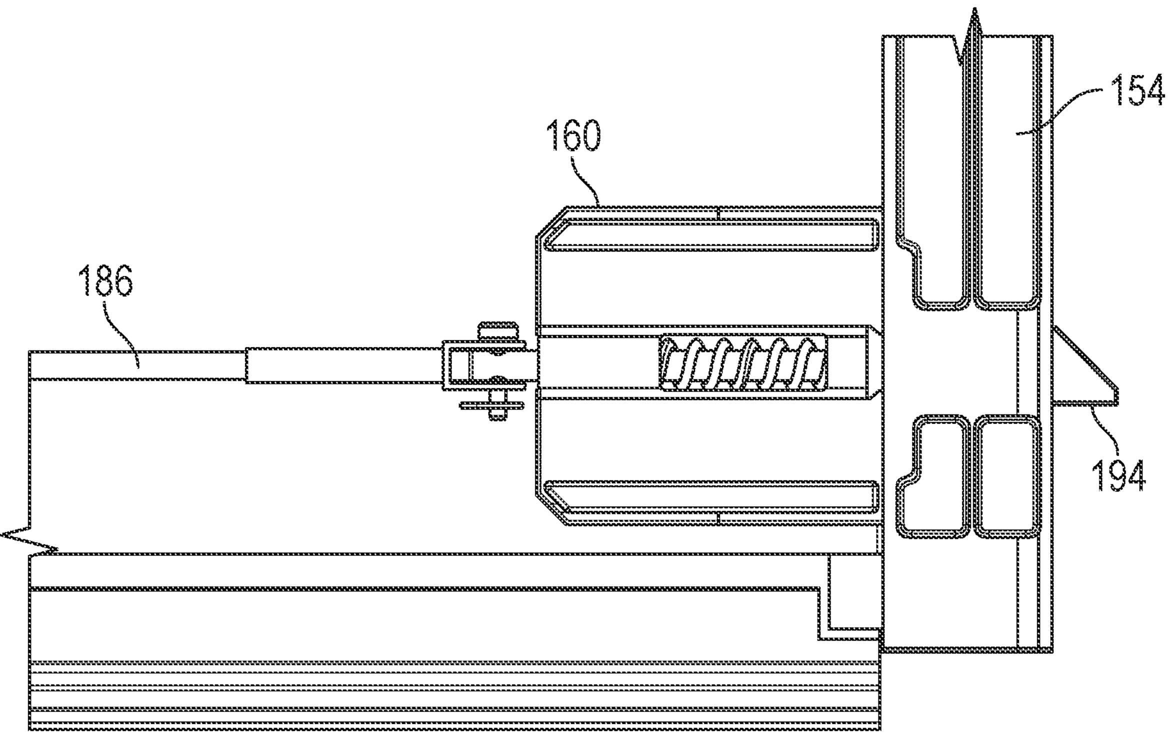
FIG. 15 illustrates a bottom view of a portion of an end panel, in accordance with implementations of the subject technology.
Figure 16:
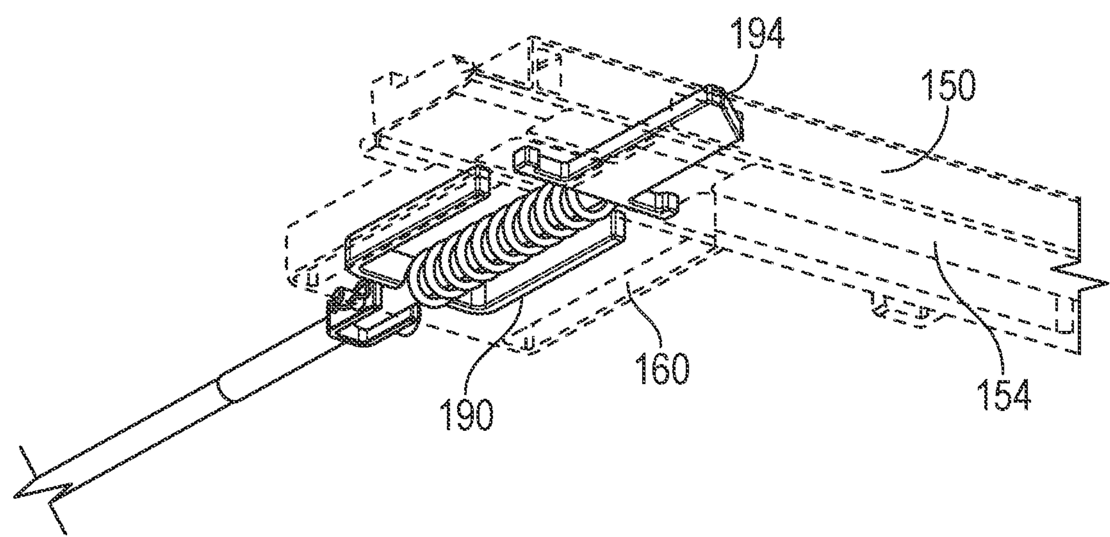
FIG. 16 illustrates a perspective view of a portion of a portion of a tonneau cover, in accordance with implementations of the subject technology.

Referring now to FIGS. 14-17, the panels can include features for supporting a locking assembly. As shown in FIGS. 14-16, the end panel 130A can further include a holder 160 configured to receive the anchor 190 of the locking assembly 180. For example, the locking assembly 180 can be installed with the retention tab 194 extending through an opening in the slider 150 and the anchor 190 resting within the holder 160. The holder 160 can include structure to retain the anchor 190 therein while also holding the anchor 190 in place during extension and retraction of the retention tab 194 and/or the cable 186. The holder 160 and one or more portions of the locking assembly 180 can optionally reside within a slat 140 (not shown) and/or a slider 150.

Figure 17:
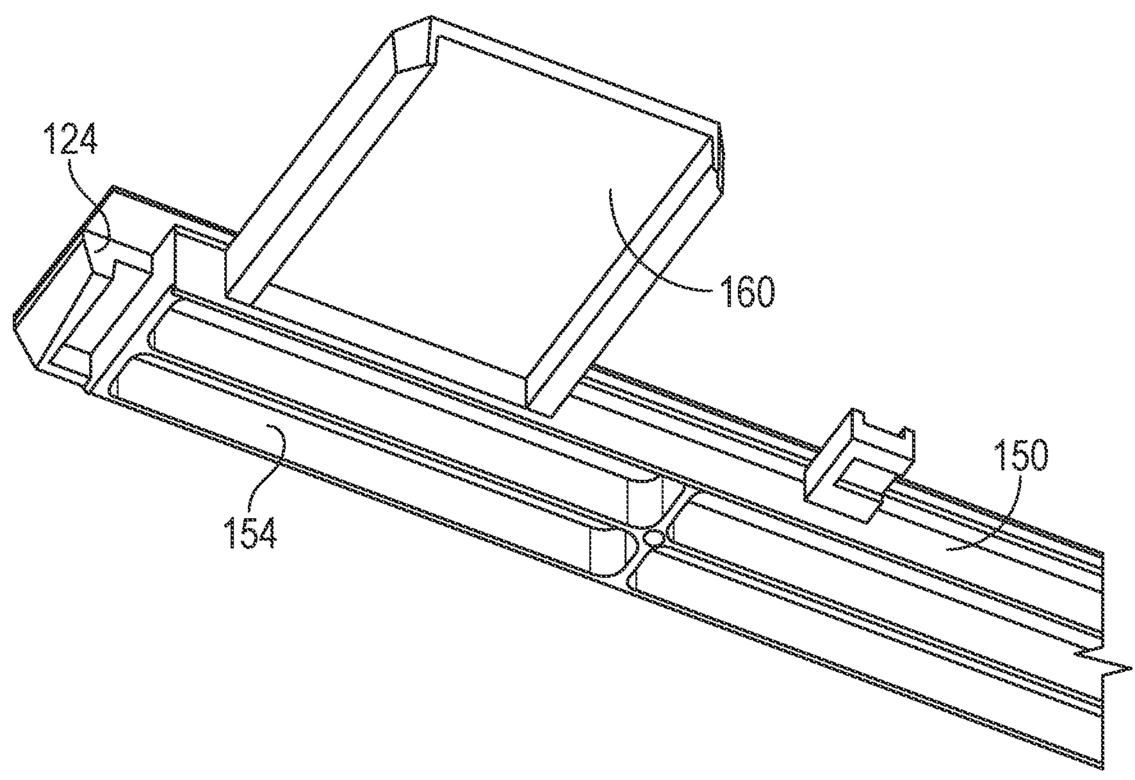
FIG. 17 illustrates a perspective view of a slider, in accordance with implementations of the subject technology.

As shown in FIGS. 15-17, the sliders 150 can include pockets 154 and/or other structures to collect debris (e.g., dirt, dust, etc.) therein. For example, while the slider 150 of the panel moves within a rail, such debris can interpose itself there between. By providing pockets 154 along the sliders 150, such debris can collect therein instead of between surfaces of the sliders 150 and the rails, which are near each other. As such, the pockets 154 provide a region for such debris to collect so that it does not become jammed between the sliders 150 and the rails. Optionally, the pockets 154 can connect to other drainage features of the panels and/or the rails.

Figure 18:
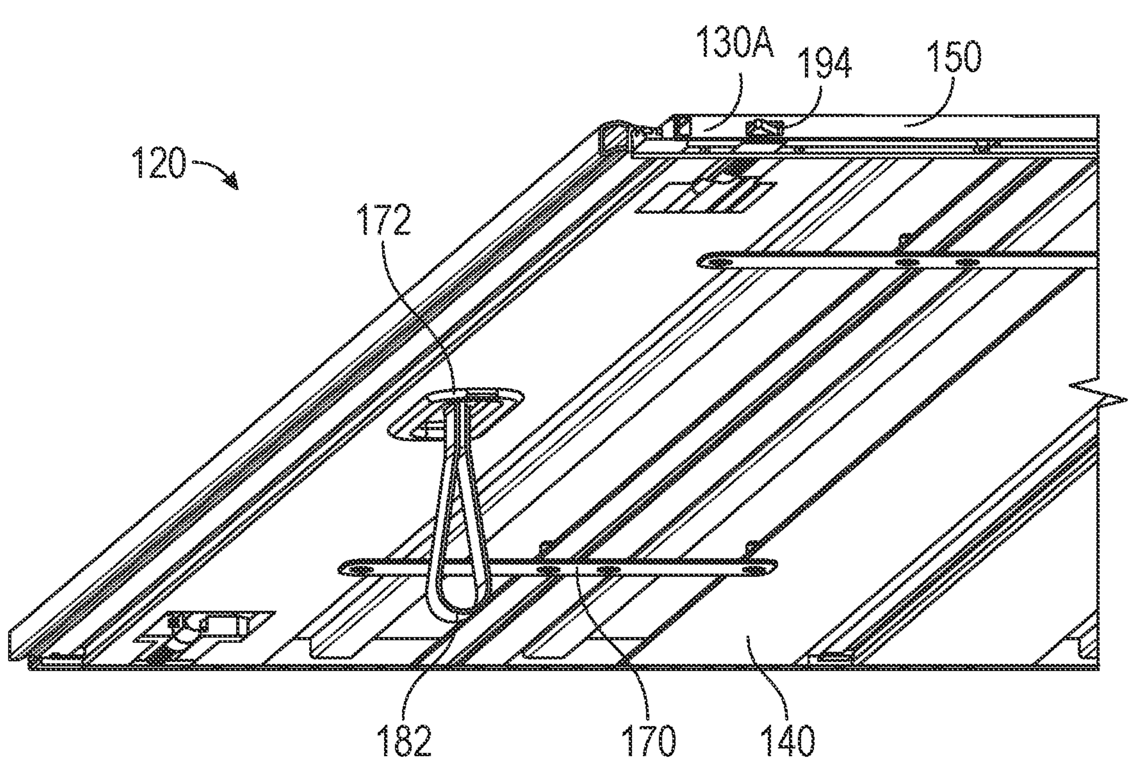
FIG. 18 illustrates a perspective view of a portion of a tonneau cover, in accordance with implementations of the subject technology.

As shown in FIG. 18, the end panel 130A can be assembled with other panels in a manner that allows the release handle 182 to extend from therein. As shown, the release handle 182 can extend from a bottom side of the end panel 130A, such that it is accessible by a user for pulling and actuating the retention tabs 194 of the locking assembly. For example, the release handle 182 can extend from within the slat 140 and through an opening 172 in the slat 140. In some embodiments, the slat 140 of a given panel can include multiple parts that are joined together with one or more connectors 170. In some embodiments, a single slat 140 of a given panel 130 can be assembled as a single, monolithic piece.

Figure 19:
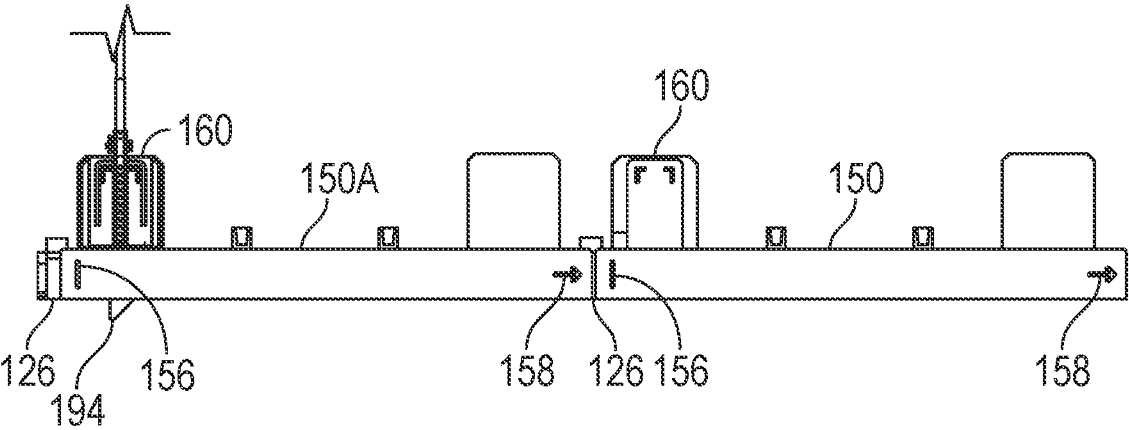
FIG. 19 illustrates a top view of a pair of sliders assembled together, in accordance with implementations of the subject technology.

As shown in FIG. 19, sliders 150 of adjacent panels can be attached to each other with various features to facilitate assembly. In some embodiments, each slider 150 can include one or more directional markers 158 that indicates a recommended direction of insertion into rails of the vehicle. By inserting the panels in the correct direction, the appropriate receptacles 126 will be available for attaching additional panels (e.g., with engagers 124). In some embodiments, each slider 150 can include an insertion marker 156 that indicates a recommended extent of insertion. By aligning the insertion marker 156 with an end of the rail, the corresponding panel will be secured with respect to the rail 106 while also leaving exposed a receptacle 126 for optional attachment of an additional panel to the partially inserted panel. As further shown in FIG. 19, a holder 160 of an end slider 150A (e.g., of an end panel 130A) can secure a portion of a locking assembly. While the inner slider 150 need not include a locking assembly, the inner slider 150 of an inner panel 130 can nonetheless include a holder 160 for simplicity of fabrication and/or for engagement with a corresponding slat (not shown). In particular, the sliders 150 of the end panels 130A can optionally match the sliders 150 of the inner panels 130. In some embodiments, the sliders 150 of the inner panels 130 need not include each and every feature of the sliders 150 of the end panel 130A, but can rather omit one or more features (e.g., holders 160).

Figure 20:
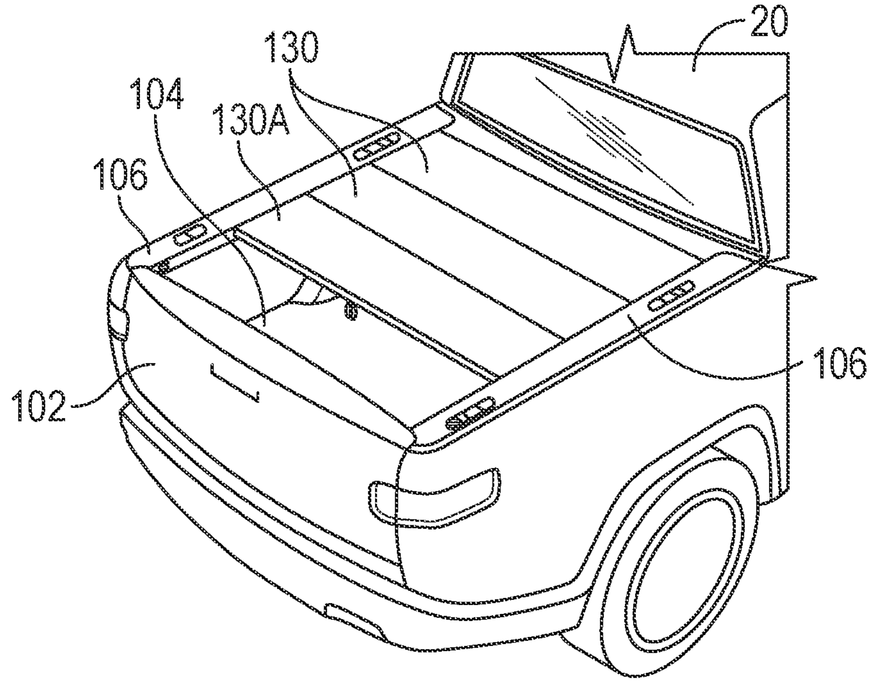
FIG. 20 illustrates a perspective view of a portion of a vehicle without a tonneau cover, in accordance with implementations of the subject technology.

As shown in FIG. 20, a tonneau cover 120 can be assembled with fewer than all of the panels that are available for covering the cargo area 104 of the vehicle 20. For example, while the tonneau cover 120 of FIGS. 4 and 5 include three inner panels 130 and one end panel 130A, a smaller number of inner panels 130 can be installed and coupled to the end panel 130A, as shown in FIG. 20. Where fewer than the maximum number of inner panels 130 are used, a portion of the cargo area 104 can remain exposed by the tonneau cover 120. This can allow items within the cargo area 104 to extend and/or protrude beyond the tonneau cover 120, which can facilitate storage of items that are somewhat larger than the cargo area 104. In such a configuration, the end panel 130A of the tonneau cover 120 can nonetheless be secured to the recesses 108 of the rails 106. Where multiple recesses 108 are provided, the end panel 130A can be secured to any one of the recesses 108. The end panel 130A may be guided to a particular one of the recesses 108 based on the number of inner panels 130 that are installed prior to introduction of the end panel 130A. While the tonneau cover 120 of FIG. 20 is shown as secured in the most forward possible position, the panels 130 can nonetheless be arranged differently (e.g., in the most rearward possible position). Furthermore, when the tailgate 102 is in the closed configuration, the tonneau cover 120 can be secured to the rails 106. For example, the tailgate 102 can block the end of the rails 106 that provides removal of the panels. Locking the tailgate 102 into the closed configuration thereof can accordingly lock the tonneau cover 120 over the cargo area 104. As such, only limited access to the cargo area 104 may be provided. Accordingly, insertion and/or removal of items into or out of the cargo area 104 can be limited by the opening provided by the smaller tonneau cover 120. Items larger than such an opening may be retained within the cargo area 104 even while portions thereof can protrude beyond the tonneau cover 120.

In some embodiments, the tonneau covers of the present disclosure can facilitate installation and removal with respect to other features of the vehicle, such as toolboxes, accessories, and the like. When not in use, the panels of the tonneau cover can be stored separately and/or in a stacked configuration to optimize space efficiency.

While the tonneau covers of the present disclosure are described in some embodiments as being capable of manual installation and/or removal, it will be understood that such procedures can be automated by actively controlled mechanisms of the vehicle. While the tonneau covers of the present disclosure are described as being capable of insertion and/or removal at a rear end of the vehicle, it will be understood that such tonneau covers can be inserted and/or removed from any end of the vehicle. In some embodiments, the vehicle can further include an additional cover mechanism, such as an automated cover.

The following patents and applications are hereby incorporated by reference in their entirety, as is fully set forth herein: U.S. Pat. Nos. 11,318,826; 10,525,804; 11,091,013; and U.S. Pat. Pub. No. 2022/0048435.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for".

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. An end panel for a tonneau cover, the end panel comprising:
- an engager configured to releasably engage a receptacle of an inner panel;
- sliders at opposing sides of the end panel and configured to be inserted into rails of a cargo area;
- a slat extending between the sliders and defining a bottom side for facing the cargo area when the sliders are inserted into the rails; and
- a locking assembly comprising:
  - retention tabs each retractably extending through a corresponding one of the sliders;
  - a release handle at the bottom side of the slat and facing the cargo area when the sliders are within the rails; and
  - a cable connecting the release handle to the retention tabs and being configured to retract the retention tabs towards each other and into the sliders when the release handle is actuated.

2. The end panel of claim 1, wherein the locking assembly further comprises:
- anchors coupled to the slat of the end panel; and
- springs each configured to bias a corresponding one of the retention tabs away from a corresponding one of the anchors.

3. The end panel of claim 2, wherein the sliders define holders each configured to secure a corresponding one of the anchors, wherein the holders extend into the slat.

4. The end panel of claim 1, wherein the retention tabs each define an inner surface extending transversely to the sliders and an outer surface extending orthogonally to the sliders.

5. The end panel of claim 1, wherein the cable extends within the slat and the release handle extends out of the slat.

6. The end panel of claim 1, further comprising an end seal that is on a side of the end panel that is opposite the engager.

7. A tonneau cover for a vehicle, the tonneau cover comprising:
- an inner panel comprising a receptacle; and
- an end panel comprising:
  - an engager configured to releasably engage the receptacle of the inner panel;
  - sliders at opposing sides of the end panel; and
  - a locking assembly comprising:
    - retention tabs each retractably extending through a corresponding one of the sliders, wherein the retention tabs each define (1) an inner surface extending transversely to the sliders and facing towards the engager and (2) an outer surface extending orthogonally to the sliders and facing away from the engager; and
    - a release handle configured to retract each of the retention tabs towards the corresponding one of the sliders when the release handle is actuated.

8. The tonneau cover of claim 7, wherein the locking assembly further comprises;
- anchors coupled to a slat of the end panel; and springs each configured to bias a corresponding one of the retention tabs away from a corresponding one of the anchors.

9. The tonneau cover of claim 8, wherein the sliders define holders each configured to secure a corresponding one of the anchors, wherein the holders extend into the slat.

10. The tonneau cover of claim 7, wherein the end panel further comprises a seal extending between the sliders on a side of the end panel that is opposite the engager.

11. The tonneau cover of claim 7, further comprising an additional inner panel comprising an additional receptacle.

12. The tonneau cover of claim 11, wherein the inner panel further comprises:

an additional engager configured to releasably engage the additional receptacle of the additional inner panel, the additional engager being on a side of the inner panel that is opposite the receptacle; and additional sliders at opposing sides of the inner panel.

13. The tonneau cover of claim 7, wherein the end panel further comprises:

a cable connecting the release handle to the retention tabs; and a slat extending between the sliders, wherein the cable extends within the slat and the release handle extends out of the slat.

14. The tonneau cover of claim 7, wherein the end panel further comprises an end seal that is on a side of the end panel that is opposite the engager.

15. A method of assembling a tonneau cover, the method comprising:

inserting an inner panel partially into rails of a vehicle to partially cover a cargo area;

while a portion of the inner panel is within the rails and one or more receptacles of the inner panel are outside of the rails, engaging the one or more receptacles with engagers of an end panel;

inserting the end panel into the rails while advancing the inner panel along the rails to further cover the cargo area; and engaging recesses defined by the rails with retention tabs of the end panel to lock the end panel with respect to the rails.

16. The method of claim 15, wherein inserting the end panel into the rails comprises retracting the retention tabs to be within the rails.

17. The method of claim 16, wherein retracting the retention tabs comprises overcoming a bias to extend the retention tabs away from each other.

18. The method of claim 16, further comprising closing a tailgate of the vehicle to abut the end panel and enclose the cargo area.

19. The method of claim 15, further comprising:

actuating a release handle to retract the retention tabs out of the recesses;

removing the end panel from the rails while retracting the inner panel along the rails; and removing the inner panel from the rails.

20. The end panel of claim 1, wherein the release handle extends from the bottom side of the slat and towards the cargo area when the sliders are within the rails.

* * * * *